C. E. GOULD.
AUXILIARY TIRE.
APPLICATION FILED MAR. 9, 1916.
1,262,324.
Patented Apr. 9, 1918.
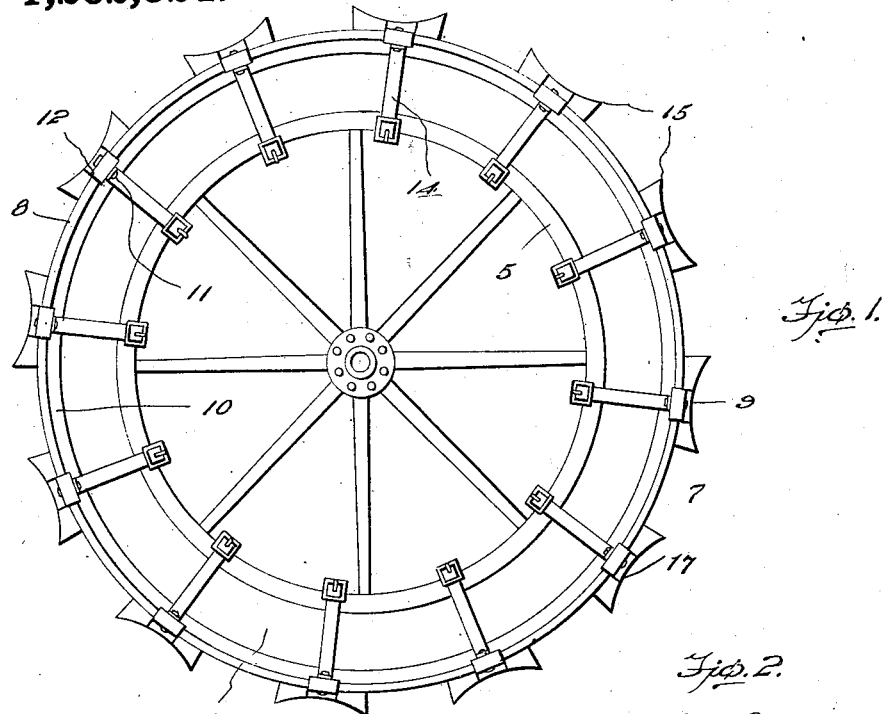
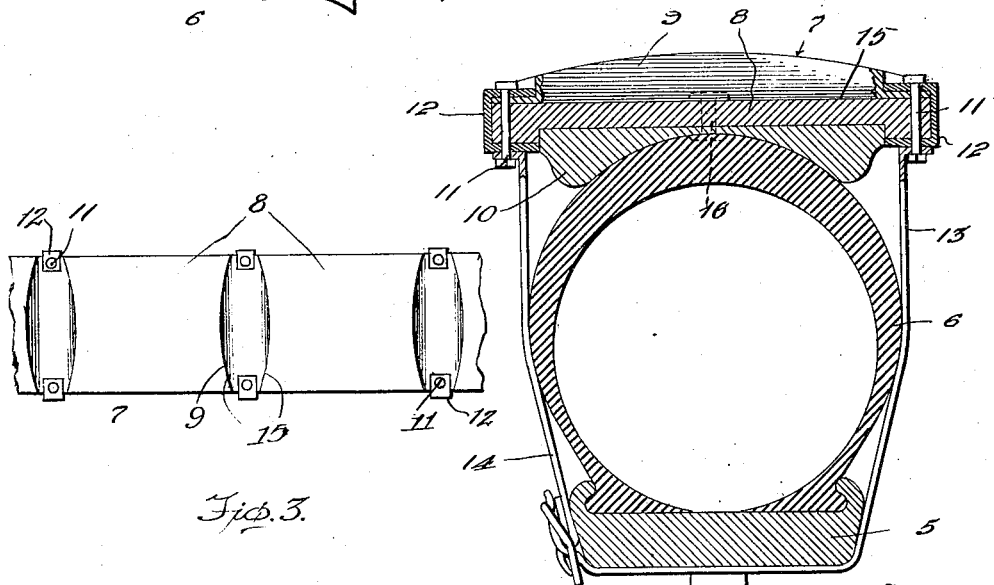
Inventor
Chas. E. Gould.
Witnesses
Paul M. Hunt
F. M. Roberts
By John Louis Waters
Attorney

UNITED STATES PATENT OFFICE.

CHARLES E. GOULD, OF BOYNE CITY, MICHIGAN.

AUXILIARY TIRE.

1,262,324.  Specification of Letters Patent.  Patented Apr. 9, 1918.

Application filed March 9, 1916. Serial No. 83,075.

*To all whom it may concern:*

Be it known that I, CHARLES E. GOULD, a citizen of the United States, residing at Boyne City, in the county of Charlevoix and State of Michigan, have invented certain useful Improvements in Auxiliary Tires, of which the following is a specification, reference being had therein to the accompanying drawing.

This invention relates to improvements in pneumatic tires, one object of the invention being the provision of an auxiliary tread for the same that is easily attached and which acts as a non-skidding device therefor, and at the same time materially lengthens the life and wear of the tire proper.

A further object of this invention is the provision of a device of this character which is adapted to fit circumferentially and exteriorly of the tread of the usual pneumatic tire, and carrying a ground engaging portion that is relatively flat in cross section, there being provided means for detachably securing the same in place.

A still further object of the invention is the provision of an auxiliary tread for pneumatic tires which is simple, durable and inexpensive in construction, and which is thoroughly efficient and practical in use.

In the accompanying drawings:—

Figure 1 is a side elevation of a motor car wheel with pneumatic tire equipped with my invention.

Fig. 2 is a cross section through such invention upon a tire and rim, and

Fig. 3 is a fragmentary plan view of the tread of the auxiliary device.

Referring to the drawings, the numeral 5 designates the rim of a motor car wheel of usual construction and carrying the pneumatic tire 6, also of usual construction, my auxiliary tread 7, being shown applied in Figs. 1 and 2.

My invention consists of tread portion 8 in the form of an annulus, which carries thereon at its outer face transversely disposed strips 9, which may be of any shape and material. Carried upon the underside of the tread portion 8 is the resilient tire engaging member 10, adapted to rest upon the tire 6, as clearly shown in Fig. 2.

Attached by bolts or rivets 11 to the opposite edges of the tread portion 8, at equidistant points throughout the circumference thereof are U-shaped cleats or clips 12 to which are connected two safety straps 13 and 14, which embrace the rim 5 and tire 6 of the wheel and have their ends detachably and adjustably connected together for the fastening of the auxiliary tire in place upon the pneumatic tire and rim as will be obvious.

The underside of the tread portion 8 is provided with a recess 15 in which fits the tire engaging resilient member 10, which is held seated therein by cement and the medial rivet 16.

The strips 9 are shaped so as not to catch and hold mud or other sticky substances, their peculiar shape being what I term "oblong" but formed with the outer concave surfaces 17.

It is apparent from the foregoing description that an auxiliary tire or tread made according to the present invention can be readily placed upon the usual pneumatic tire, and will present to the road surface a greater area of tread and at the same time prevent unusual wear upon the tire proper.

What I claim, as new, is:—

In a device of the class described, in combination, a wheel having a pneumatic tire, an annular tread portion secured relatively to said tire and having its periphery arranged substantially concentrically of the axle of said wheel, said tread portion having its opposing marginal portions projecting laterally of the sides of said tire, a circumferential series of auxiliary treads extending transversely across said member and provided at opposite sides with recesses, a series of channel-shaped cleats adapted to engage with their connecting portions against the side edges of said annular member, and the edges of said auxiliary treads and having their parallel sides straddling the bottom walls of said recesses and the inner sides of said marginal portions, and bolts adapted to clamp said cleats, said auxiliary treads and said annular member together.

In testimony whereof I affix my signature.

CHARLES E. GOULD.

Copies of this patent may be obtained for five cents each, by addressing the "Commissioner of Patents, Washington, D. C."